(12) United States Patent
Xiang et al.

(10) Patent No.: US 12,118,129 B2
(45) Date of Patent: Oct. 15, 2024

(54) METHOD, SYSTEM, ELECTRONIC DEVICE, AND STORAGE MEDIUM FOR STORING AND COLLECTING TEMPERATURE DATA

(71) Applicant: Shanghai NanoJClean Technology Co., Ltd., Shanghai (CN)

(72) Inventors: Xuejiao Xiang, Shanghai (CN); Fuyi Liu, Shanghai (CN); Youyong Yang, Shanghai (CN); Jianliang Gu, Shanghai (CN)

(73) Assignee: Shanghai NanoJClean Technology Co., Ltd., Shanghai (CN)

( * ) Notice: Subject to any disclaimer, the term of this patent is extended or adjusted under 35 U.S.C. 154(b) by 177 days.

(21) Appl. No.: 17/767,208

(22) PCT Filed: Oct. 9, 2020

(86) PCT No.: PCT/CN2020/120002
§ 371 (c)(1),
(2) Date: Apr. 7, 2022

(87) PCT Pub. No.: WO2021/068891
PCT Pub. Date: Apr. 15, 2021

(65) Prior Publication Data
US 2022/0366089 A1 Nov. 17, 2022

(30) Foreign Application Priority Data
Oct. 8, 2019 (CN) .......................... 201910949277.1

(51) Int. Cl.
*G06F 21/64* (2013.01)
*G01K 1/022* (2021.01)
(Continued)

(52) U.S. Cl.
CPC ........... *G06F 21/645* (2013.01); *G01K 1/022* (2013.01); *G06F 21/602* (2013.01);
(Continued)

(58) Field of Classification Search
CPC .. G06F 21/645; G06F 21/602; G06F 21/6218; G06F 21/64; G01K 1/022;
(Continued)

(56) References Cited

U.S. PATENT DOCUMENTS

2014/0222521 A1* 8/2014 Chait ................. G06Q 10/0633
705/7.36
2016/0335592 A1* 11/2016 Varga .................. G06F 16/2358
(Continued)

FOREIGN PATENT DOCUMENTS

CN         2050599 U     1/1990
CN       102192794 A     9/2011
(Continued)

*Primary Examiner* — Cheng-Feng Huang
(74) *Attorney, Agent, or Firm* — Downs Rachlin Martin PLLC

(57) ABSTRACT

Collecting and storing temperature data includes acquiring a starting time at a temperature recording time period and acquiring temperature data for each time stamp. The target compressed data corresponding to the temperature recording time period is obtained by compressing the temperature data. The starting time data and the target compressed data corresponding to the temperature recording time period is stored in a temperature recorder. Multiple temperature data points may correspond to one piece of compressed data, so that each piece of temperature data only occupies a small amount of storage space. The starting time data and multiple pieces of compressed data are stored in the temperature recorder together, allowing improved storage performance of the temperature recorder and rapid collection of the temperature data. A blockchain-based verification for the collected temperature data ensures the security and authenticity of the data collection and prevents the data from being tampered with.

14 Claims, 5 Drawing Sheets

(51) Int. Cl.
*G06F 21/60* (2013.01)
*G06F 21/62* (2013.01)
*G06Q 10/0832* (2023.01)
*G06Q 10/0833* (2023.01)
*H04L 9/32* (2006.01)
*G06Q 10/083* (2023.01)
*G06Q 50/40* (2024.01)

(52) U.S. Cl.
CPC ..... *G06F 21/6218* (2013.01); *G06Q 10/0832* (2013.01); *G06Q 10/0833* (2013.01); *H04L 9/3242* (2013.01); *G06F 21/64* (2013.01); *G06Q 10/083* (2013.01); *G06Q 50/40* (2024.01)

(58) Field of Classification Search
CPC .......... G06Q 10/0832; G06Q 10/0833; G06Q 10/083; G06Q 50/40; H04L 9/3242
See application file for complete search history.

(56) References Cited

U.S. PATENT DOCUMENTS

| | | | |
|---|---|---|---|
| 2018/0121870 | A1* | 5/2018 | Alonso Echevarría ..................... F25D 11/003 |
| 2018/0307442 | A1 | 10/2018 | Auvenshine et al. |
| 2019/0207755 | A1 | 7/2019 | Gu et al. |
| 2020/0387639 | A1* | 12/2020 | Hummel ............... H04L 9/3297 |

FOREIGN PATENT DOCUMENTS

| | | |
|---|---|---|
| CN | 105590438 A | 5/2016 |
| CN | 107330337 A | 11/2017 |
| CN | 108228830 A | 6/2018 |
| CN | 108306896 A | 7/2018 |
| CN | 108916959 A | 11/2018 |
| CN | 109683827 A | 4/2019 |
| CN | 110083606 A | 8/2019 |
| WO | 2014201059 A1 | 12/2014 |
| WO | 2019079890 A1 | 5/2019 |

* cited by examiner

METHOD, SYSTEM, ELECTRONIC DEVICE, AND STORAGE MEDIUM FOR STORING AND COLLECTING TEMPERATURE DATA

TECHNICAL FIELD

The present disclosure relates to the technical field of cold chain management, in particular to a method, a system, an electronic device, and a storage medium for storing and collecting temperature data.

BACKGROUND

At present, the demand for cold chain transportation has penetrated into all aspects of people's daily life. Either fresh and live products (such as vegetables, fruits, and meat) or medicines or equipment that needs to be refrigerated should be maintained within a certain temperature range to be kept fresh and effective. That is, temperature change is an important manifestation of the quality of goods transportation. Therefore, it is extremely important to accurately record the temperature of a cold chain transportation process, and accordingly, storage and collection of temperature data of the cold chain transportation process also becomes particularly important.

However, in existing data collection schemes, in order to store more temperature data, a device with a large storage space is needed, which results in cost increases. In order to read the stored temperature data, a universal serial bus (USB)-based computer connection and communication or a Bluetooth communication has to be adopted, which increases the size and price of a temperature recorder as compared to other configurations, such as a temperature recorder configured for data transmission using near field communication (NFC). When NFC is adopted for data transmission, due to its corresponding fixed transmission rate and capacity, it is likely to cause a small amount of data transmitted per unit time. When the amount of data is large, the data transmission consumes a long time.

SUMMARY OF THE INVENTION

The technical problem to be solved by the present disclosure is to provide a method, a system, an electronic device, and a storage medium for storing and collecting temperature data, so as to overcome the defects in the prior art where the cost for data storage is increased when a temperature recorder with a large storage space is selected, the size for data collection is increased when USB or Bluetooth communication is adopted, the NFC data transmission consumes a long time when the amount of data is large, etc.

The present disclosure solves the above technical problems through the following technical solutions.

The present disclosure provides a method for storing temperature data in a temperature recorder. The storage method includes:

S11: acquiring starting time data corresponding to a temperature recording time period, and acquiring actual temperature data corresponding to each time stamp in the temperature recording time period of the temperature recorder;

S12: obtaining at least one piece of target compressed data corresponding to the temperature recording time period by compressing the actual temperature data, wherein each piece of the target compressed data corresponds to the plurality of pieces of actual temperature data;

S13: storing the starting time data and the target compressed data corresponding to the temperature recording time period into a storage space of the temperature recorder.

In some examples, step S12 includes:

converting the actual temperature data into intermediate temperature data, wherein the intermediate temperature data is data in a binary format; and compressing the intermediate temperature data to obtain at least one piece of the target compressed data, wherein each piece of the target compressed data corresponds to a set quantity of bits or bytes.

In some examples, each piece of the target compressed data corresponds to one bit; and/or the number of pieces of the actual temperature data corresponding to each piece of the target compressed data is positively correlated with a temperature change range corresponding to the temperature recording time period.

In some examples, the storage space includes a first storage space and a second storage space;

and in the data storage process, step S13 comprises:

determining whether the first storage space is full, if the first storage space is not full, pre-compressing the actual temperature data to obtain first temperature data, and storing the first temperature data into the first storage space;

if the first storage space is full, determining whether the second storage space is full, if the second storage space is not full, compressing all the first temperature data in the first storage space, acquiring the plurality of pieces of target compressed data corresponding to the temperature recording time period, and sequentially storing the target compressed data into the second storage space in a chronological order while deleting all the data in the first storage space; and if the second storage space is full, generate a reminder message reminding that storage cannot be continued.

In some examples, the storage space further includes a third storage space;

and the storage method further comprises:

when the temperature recorder is bound to an application in data collection equipment, storing a public key and a private key generated in the binding process into the third storage space;

when a situation where the first storage space is full and the second storage space is not full appears in the temperature recorder for the first time, decompressing all the pre-compressed first temperature data in the first storage space to acquire the corresponding actual temperature data;

performing hash calculation on the actual temperature data and the private key to obtain a first signature value;

when the situation where the first storage space is full and the second storage space is not full appears for the Nth time, performing hash calculation on the actual temperature data, the private key, and the previously corresponding first signature value to obtain a new first signature value, where N≥2 and N is an integer;

when the temperature recorder finishes recording temperature data, if there is no data in the first storage space, using the first signature value as a target signature value; and/or when the temperature recorder finishes recording temperature data, if the first storage space is not full and the second storage space is not full, performing hash calculation on the actual temperature data, the private key, and the previously corresponding first signature value to obtain a target signature value; and storing the target signature value into the third storage space.

The present disclosure also provides a method for collecting temperature data, the collection method being implemented based on the above method for storing temperature data in a temperature recorder;

and the collection method comprises:

S21: sending, by an application, a temperature collection request to the temperature recorder;

S22: sending, by the temperature recorder, the plurality of pieces of target compressed data corresponding to the temperature recording time period to the application according to the temperature collection request; and S23: decompressing, by the application, the target compressed data to acquire the actual temperature data corresponding to each time stamp in the temperature recording time period.

In some examples, before step S21, the method further includes:

acquiring a name, a version number, and an identification number of the application;

performing hash calculation according to the name, the version number, and the identification number of the application to obtain a first hash value;

uplinking the first hash value to a blockchain server;

acquiring first identification data of the temperature recorder and second identification data of the application;

performing hash calculation on the first identification data and the second identification data to obtain a public key; and uplinking the public key to the blockchain server, and performing hash calculation in the blockchain server according to the public key to obtain a private key, wherein both the public key and the private key are stored in the temperature recorder; before step S21, the method further includes:

acquiring a first name, a first version number, and a first identification number of the application;

performing hash calculation according to the first name, the first version number, and the first identification number of the application to obtain a second hash value; and determining whether the second hash value and the first hash value are consistent, and if they are consistent, determining that the application is valid, otherwise, determining that the application is invalid.

In some examples, step S22 further includes:

sending, by the temperature recorder, a target signature value to the application according to the temperature collection request;

and after step S23, the method further comprises:

S24: sending, by the application, the target signature value and the actual temperature data to the blockchain server;

S25: performing, by the blockchain server, hash calculation according to the private key and the actual temperature data to obtain a second signature value; and S26: determining whether the second signature value and the target signature value are consistent, and if they are consistent, determining that the actual temperature data is not tampered with.

In some examples, when the first storage space of the temperature recorder is full and the corresponding number of pieces of temperature data is a first set quantity, the step of performing, by the blockchain server, hash calculation according to the private key and the actual temperature data to obtain a second signature value includes:

when the number of pieces of temperature data corresponding to the temperature recording time period is less than or equal to the first set quantity, performing hash calculation according to the private key and the actual temperature data to obtain the second signature value;

when the number of pieces of temperature data corresponding to the temperature recording time period is greater than the first set quantity, performing hash calculation on the private key and a first group of the first set quantity of actual temperature data in a chronological order to obtain a fourth signature value;

continuing to perform hash calculation on the private key, a Mth group of the first set quantity of actual temperature data, and the fourth signature value corresponding to the previous group to obtain a fifth signature value, where M≥2 and M is an integer;

when the number of remaining pieces of temperature data in the temperature recording time period is less than or equal to the first set quantity, performing hash calculation according to the private key, the remaining actual temperature data, and the fifth signature value corresponding to the previous group to obtain the second signature value; and/or before step S24, the method further comprises:

sending, by the temperature recorder, the total number of pieces of first temperature data stored in the temperature recorder to the application according to the temperature collection request;

calculating, by the application, the total number of pieces of second temperature data corresponding to the actual temperature data; and determining whether the total number of pieces of first temperature data and the total number of pieces of second temperature data are consistent, and if they are consistent, determining to perform step S24.

The present disclosure also provides a system for storing temperature data in a temperature recorder, and the storage system includes a time data acquisition module, a temperature data acquisition module, a compressed data acquisition module, and a storage module;

the time data acquisition module is configured to acquire starting time data corresponding to a temperature recording time period;

the temperature data acquisition module is configured to acquire actual temperature data corresponding to each time stamp in the temperature recording time period of the temperature recorder;

the compressed data acquisition module is configured to obtain at least one piece of target compressed data corresponding to the temperature recording time period by compressing the actual temperature data, wherein each piece of the target compressed data corresponds to the plurality of pieces of actual temperature data;

the storage module is configured to store the starting time data and the target compressed data corresponding to the temperature recording time period into a storage space of the temperature recorder.

In some examples, the compressed data acquisition module includes a data conversion unit and a compression unit;

the data conversion unit is configured to convert the actual temperature data into intermediate temperature data, wherein the intermediate temperature data is data in a binary format; and the compression unit is configured to compress the intermediate temperature data to obtain at least one piece of the target compressed data, wherein each piece of the target compressed data corresponds to a set quantity of bits or bytes.

In some examples, each piece of the target compressed data corresponds to one bit; and/or the number of pieces of the actual temperature data corresponding to each piece of the target compressed data is positively correlated with a temperature change range corresponding to the temperature recording time period.

In some examples, the storage space includes a first storage space and a second storage space;

in the data storage process, the storage module is configured to determine whether the first storage space is full, if the first storage space is not full, pre-compress the actual temperature data to obtain first temperature data, and store the first temperature data into the first storage space;

if the first storage space is full, determine whether the second storage space is full, if the second storage space is not full, compress all the first temperature data in the first storage space, acquire the plurality of pieces of target compressed data corresponding to the temperature recording time period, and sequentially store the target compressed data into the second storage space in a chronological order while deleting all the data in the first storage space; and if the second storage space is full, generate a reminder message reminding that storage cannot be continued.

In some examples, the storage space further includes a third storage space;

and the storage module is further configured to: store, when the temperature recorder is bound to an application in a data collection device, a public key and a private key generated in the binding process into the third storage space;

when a situation where the first storage space is full and the second storage space is not full appears in the temperature recorder for the first time, decompress all the pre-compressed first temperature data in the first storage space to acquire the corresponding actual temperature data;

perform hash calculation on the actual temperature data and the private key to obtain a first signature value;

when the situation where the first storage space is full and the second storage space is not full appears for the Nth time, perform hash calculation on the actual temperature data, the private key, and the previously corresponding first signature value, and when the temperature recorder finishes recording temperature data, acquire a corresponding target signature value to obtain a new first signature value, where N≥2 and N is an integer;

when the temperature recorder finishes recording temperature data, if there is no data in the first storage space, use the first signature value as a target signature value; and/or when the temperature recorder finishes recording temperature data, if the first storage space is not full and the second storage space is not full, perform hash calculation on the actual temperature data, the private key, and the previously corresponding first signature value to obtain a target signature value; and store the target signature value into the third storage space.

The present disclosure also provides a system for collecting temperature data, the collection system being implemented based on the above system for storing temperature data in a temperature recorder;

the collection system comprises a request sending module, a data feedback module, and a decompression module, wherein an application sends a temperature collection request to the temperature recorder according to the request sending module;

the temperature recorder uses the data feedback module to send the plurality of pieces of target compressed data corresponding to the temperature recording time period to the application according to the temperature collection request; and the application decompresses the target compressed data according to the decompression module to acquire the actual temperature data corresponding to each time stamp in the temperature recording time period.

In some examples, the collection system further includes a program data acquisition module, a first hash value acquisition module, an uplinking module, a first determination module, an identification data acquisition module, a second hash calculation module, and a private key calculation module;

the program data acquisition module is configured to acquire a name, a version number, and an identification number of the application;

the first hash calculation module is configured to perform hash calculation according to the name, the version number, and the identification number of the application to obtain a first hash value;

the uplinking module is configured to uplink the first hash value to a blockchain server;

the identification data acquisition module is configured to acquire first identification data of the temperature recorder and second identification data of the application;

the second hash calculation module is configured to perform hash calculation on the first identification data and the second identification data to obtain a public key;

the private key calculation module is configured to uplink the public key to the blockchain server, and perform hash calculation in the blockchain server according to the public key to obtain a private key, wherein both the public key and the private key are stored in the temperature recorder;

the program data acquisition module is configured to acquire a first name, a first version number, and a first identification number of the application;

the first hash calculation module is configured to perform hash calculation according to the first name, the first version number, and the first identification number of the application to obtain a second hash value; and the first determination module is configured to determine whether the second hash value and the first hash value are consistent, and if they are consistent, determine that the application is valid, otherwise, determine that the application is invalid.

In some examples, the temperature recorder uses the data feedback module to send a target signature value corresponding to the target compressed data to the application according to the temperature collection request;

the collection system further comprises a data sending module, a signature value calculation module, and a second determination module;

the application uses the data sending module to send the target signature value and the actual temperature data to the blockchain server;

the blockchain server uses the signature value calculation module to perform hash calculation according to the private key and the actual temperature data to obtain a second signature value; and the second determination module is configured to determine whether the second signature value and the target signature value are consistent, and if they are consistent, determine that the actual temperature data is not tampered with.

In some examples, when the first storage space of the temperature recorder is full and the corresponding number of pieces of temperature data is a first set quantity, the signature value calculation module is configured to: perform, when the number of pieces of temperature data corresponding to the temperature recording time period is less than or equal to the first set quantity, hash calculation according to the private key and the actual temperature data to obtain the second signature value;

perform, when the number of pieces of temperature data corresponding to the temperature recording time period is greater than the first set quantity, hash calculation on the private key and a first group of the first set quantity of actual temperature data in a chronological order to obtain a fourth signature value;

continue to perform hash calculation on the private key, a Mth group of the first set quantity of actual temperature data, and the fourth signature value corresponding to the previous group to obtain a fifth signature value, where M≥2 and M is an integer;

perform, when the number of remaining pieces of temperature data in the temperature recording time period is less than or equal to the first set quantity, hash calculation according to the private key, the remaining actual temperature data, and the fifth signature value corresponding to the previous group to obtain the second signature value; and/or the collection system further comprises a temperature quantity acquisition module, a temperature quantity calculation module, and a third determination module;

the temperature recorder uses the temperature quantity acquisition module to send the total number of pieces of first temperature data stored in the temperature recorder to the application according to the temperature collection request;

the application uses the temperature quantity calculation module to calculate the total number of pieces of second temperature data corresponding to the actual temperature data; and the third determination module is configured to determine whether the total number of pieces of first temperature data and the total number of pieces of second temperature data are consistent, and if they are consistent, call the data sending module.

The present disclosure also provide an electronic device, including a memory, a processor, and a computer program stored on the memory and runnable on the processor, wherein when executing the computer program, the processor implements the above method for storing temperature data in a temperature recorder, and/or implements the above method for collecting temperature data.

The present disclosure also provides a computer-readable storage medium having a computer program stored thereon, wherein the computer program, when executed by a processor, implements steps of the above method for storing temperature data in a temperature recorder, and/or implements the above method for collecting temperature data.

The positive and progressive effects of the present disclosure are as follows.

In the present disclosure, for the entire cold chain transportation process, starting time data and temperature data corresponding to each time stamp in the transportation process are acquired, and the temperature data is compressed. Therefore, a plurality of pieces of temperature data may correspond to one piece of compressed data, so that each piece of temperature data only occupies a very small storage space, and the starting time data and the plurality of pieces of compressed data are stored into a temperature recorder together, thereby effectively improving the storage performance of the temperature recorder. Meanwhile, when an application collects temperature data from the temperature recorder, through directly collecting the compressed data, hundreds of thousands of temperature data can be rapidly collected, thereby achieving the effect of rapidly collecting temperature data. In addition, the blockchain technology-based verification on the collected temperature data ensures the security and authenticity of temperature data collection and prevents data from being tampered with.

DETAILED DESCRIPTION

The present disclosure will be further explained by way of examples described herein and illustrated in the accompanying figures, however, the present disclosure is not limited to the scope of the described examples.

FIRST EXAMPLE IMPLEMENTATION

Figure 1:
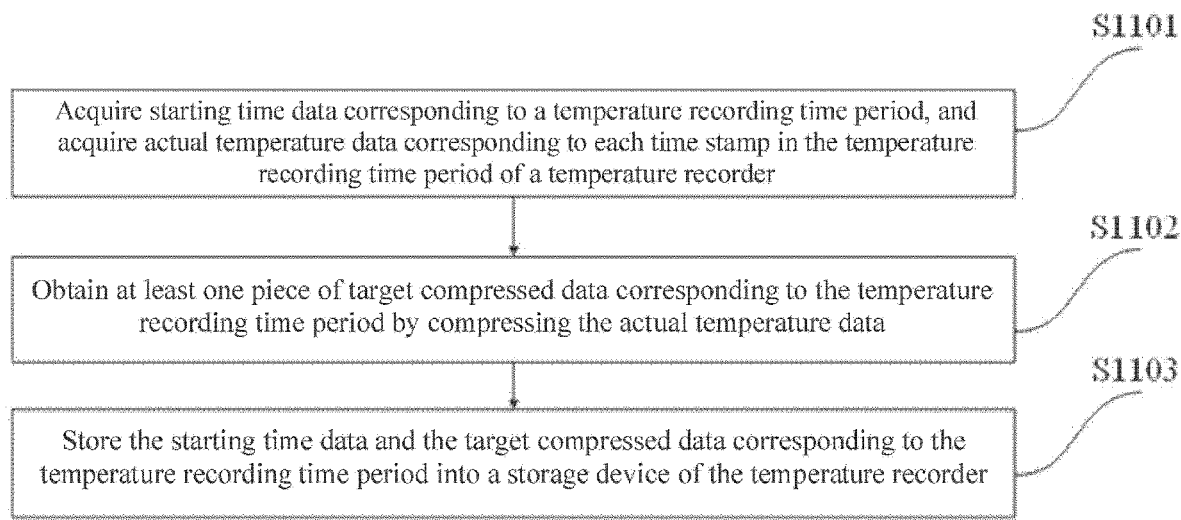
FIG. 1 is a flowchart of an example method for storing temperature data in a temperature recorder.

FIG. 1 illustrates one example of a method for storing temperature data in a temperature recorder. In the illustrated example, the method includes the following steps.

S1101: Starting time data corresponding to a temperature recording time period is acquired, and actual temperature data corresponding to each time stamp in the temperature recording time period of the temperature recorder is acquired.

S1102: At least one piece of target compressed data corresponding to the temperature recording time period is obtained by compressing the actual temperature data.

Wherein each piece of the target compressed data corresponds to a plurality of pieces of actual temperature data;

specifically, in one example, the actual temperature data is converted into intermediate temperature data, wherein the intermediate temperature data is data in a binary format; and the intermediate temperature data is compressed to obtain at least one piece of target compressed data, wherein each piece of the target compressed data corresponds to a set quantity of bits or bytes.

The value of the set quantity may be determined and adjusted according to an actual situation, as long as it can realize effective compression of temperature data.

In one example, each piece of target compressed data corresponds to one bit.

In addition, the number of pieces of the actual temperature data corresponding to each piece of target compressed data is positively correlated with a temperature change range corresponding to the temperature recording time period. The following table provides one example:

| Bits occupied for storage | number of pieces of temperature data | Storage accuracy | Absolute value of temperature change range |
|---|---|---|---|
| 5 | 32 | 0.1 | 0-3.2 |
| 6 | 64 | 0.1 | 0-6.4 |
| 7 | 128 | 0.1 | 0-12.8 |
| 8 | 256 | 0.1 | 0-25.6 |
| 9 | 512 | 0.1 | 0-51.2 |
| 10 | 1024 | 0.1 | 0-102.4 |
| 11 | 2048 | 0.1 | 0-204.8 |

That is, under the condition of certain storage accuracy, the BIT (bit) occupied by each piece of temperature data is automatically switched according to a temperature change range configured by a user.

S1103: The starting time data and the target compressed data corresponding to the temperature recording time period are stored into a storage space of the temperature recorder.

In the present embodiment, only starting time data in the temperature storage process is stored, and then each piece of temperature data is compressed and stored together with the starting time data according to bits.

A data storage situation during cold chain transportation is illustrated through the following specific examples.

Taking a refrigerated transportation temperature change range of 0° C.-7° C. as an example, it is assumed that 128 pieces of temperature data corresponding to 128 time stamps are collected.

In a prior art storage process of time stamp+temperature data, 4 bytes+2 bytes (6 bytes in total) are required for storing one piece of temperature data, that is, 128 pieces of temperature data need to occupy a storage space of 768 bytes.

In the example data storage mode disclosed herein, which may include starting time data+a plurality of pieces of target compressed data in, a storage space of only 7 bits is occupied, and 7 bits correspond to 128 pieces of temperature data, which achieves that each piece of temperature data only occupies less than one byte, thereby greatly reducing the storage space corresponding to temperature data.

In the present embodiment, for the entire cold chain transportation process, starting time data and temperature data corresponding to each time stamp in the transportation process are acquired, and the temperature data is compressed. Therefore, a plurality of pieces of temperature data may correspond to one piece of compressed data, so that each piece of temperature data only occupies a very small storage space, and the starting time data and the plurality of pieces of compressed data are stored into a temperature recorder together, thereby effectively improving the storage performance of the temperature recorder.

SECOND EXAMPLE IMPLEMENTATION

In one example, a storage space includes a first storage space, a second storage space, and a third storage space.

In the data storage process illustrated in FIG. 1, step S1103 may include:

determining whether the first storage space is full, if the first storage space is not full, pre-compressing the actual temperature data to obtain first temperature data, and storing the first temperature data into the first storage space;

if the first storage space is full, determining whether the second storage space is full, if the second storage space is not full, compressing all the first temperature data in the first storage space, acquiring the plurality of pieces of target compressed data corresponding to the temperature recording time period, and sequentially storing the target compressed data into the second storage space in a chronological order while deleting all the data in the first storage space; and if the second storage space is full, generating a reminder message reminding that storage cannot be continued.

In some examples, a storage method may further include:
  when the temperature recorder is bound to an application in a data collection device, storing a public key and a private key generated in the binding process into the third storage space,
  wherein the temperature recorder and the application in the data collection device transmit data to another computing device using a wired or wireless communication protocol, such as through Bluetooth or NFC (near-field communication);
  when a condition exists where the first storage space is full and the second storage space is not full appears in the temperature recorder for the first time, decompressing all the pre-compressed first temperature data in the first storage space to acquire the corresponding actual temperature data;
  performing a hash calculation on the actual temperature data and the private key to obtain a first signature value;
  when a condition exists where the first storage space is full and the second storage space is not full appears for the Nth time, performing a hash calculation on the actual temperature data, the private key, and the previously corresponding first signature value to obtain a new first signature value, where N≥2 and N is an integer;
  when the temperature recorder finishes recording temperature data, if there is no data in the first storage space, using the first signature value as a target signature value;
  when the temperature recorder finishes recording temperature data, if the first storage space is not full and the second storage space is not full, performing a hash calculation on the actual temperature data, the private key, and the previously corresponding first signature value to obtain a target signature value; and
  storing the target signature value into the third storage space.

That is, when the temperature recorder collects temperature data, the temperature data is first stored into the first storage space, when the first storage space is full, all data in the first storage space is compressed, for example, according to any of the compression techniques described herein and stored into the second storage space, and the data in the first storage space is cleared. Meanwhile, storing newly collected temperature data into the first storage space is continued, and the above storage process is repeated until both the first storage space and the second storage space are full, then the method may include making a determination and/or sending a notification that storage cannot be continued.

In addition, a signature value may be obtained through a calculation according to the private key obtained when the temperature recorder was bound to the application in the data collection device and the temperature data in the first storage space, and the previous signature value is added to the private key and the temperature data in the first storage space for a hash calculation to obtain a new signature value. When the temperature data storage is ended, a hash calculation is performed to obtain a final target signature value which may be used to verify whether the temperature data is tampered with to ensure the validity of the temperature data. In one example, the third storage space is located in a non-erasable area in the temperature recorder.

In one example, for an entire cold chain transportation process, starting time data and temperature data corresponding to each time stamp in the transportation process are acquired, and the temperature data is compressed. Therefore, a plurality of pieces of temperature data may correspond to one piece of compressed data, so that each piece of temperature data only occupies a very small storage space, and the starting time data and the plurality of pieces of compressed data are stored into a temperature recorder together, thereby effectively improving the storage performance of the temperature recorder.

THIRD EXAMPLE IMPLEMENTATION

Figure 2:
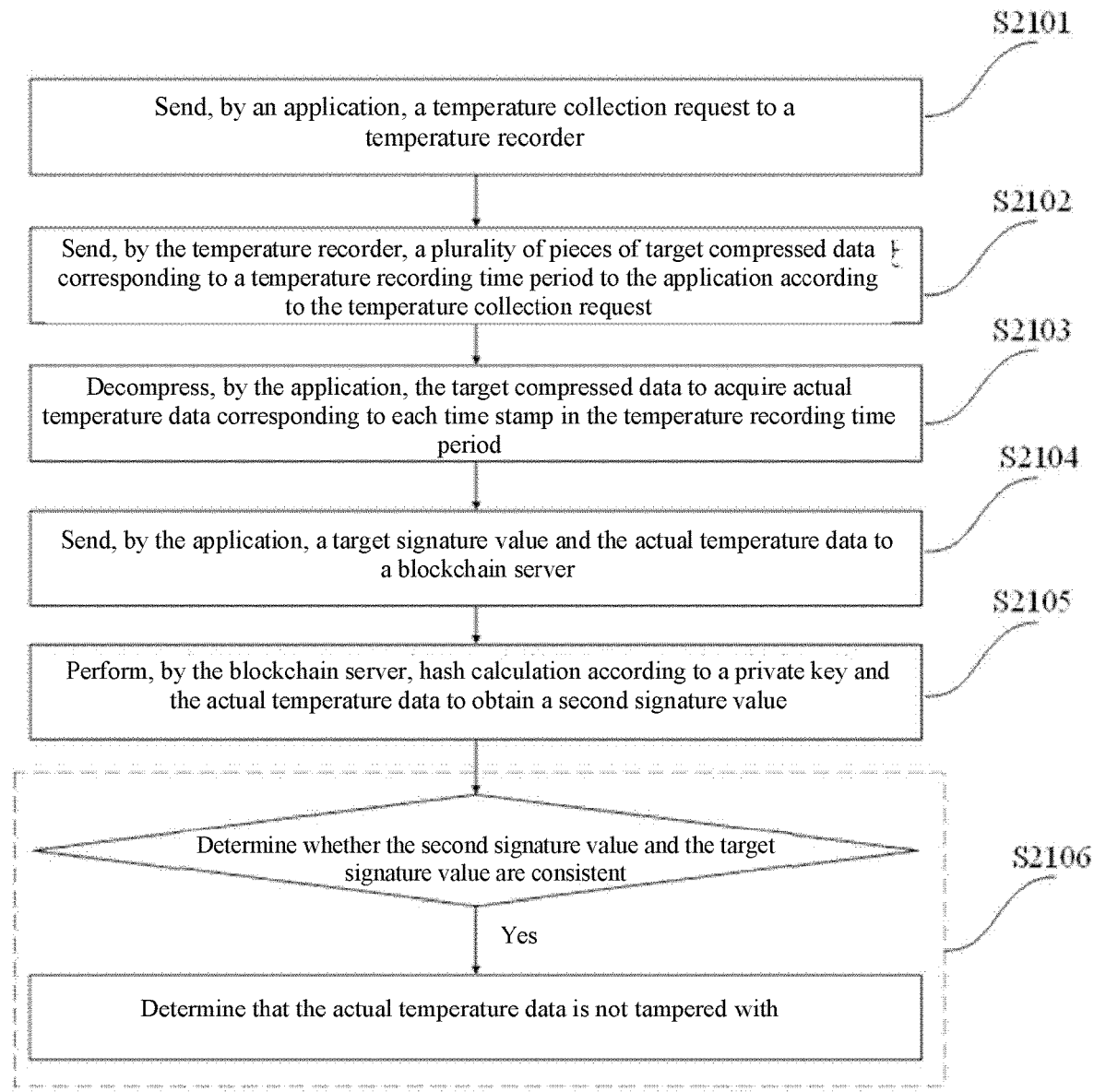
FIG. 2 is a flowchart of an example method for collecting temperature data.

FIG. 2, illustrates an example method for collecting temperature data that includes the following steps:

S2101: An application sends a temperature collection request to a temperature recorder.

S2102: The temperature recorder sends a plurality of pieces of target compressed data corresponding to a temperature recording time period to the application according to the temperature collection request.

S2103: The application decompresses the target compressed data, and acquires actual temperature data corresponding to each time stamp in the temperature recording time period.

In some existing prior art temperature collection modes, when an application collects temperature data, due to the limitation of a communication means, such as NFC, a limited amount of data can be transmitted, for example, only about 250 pieces of temperature data can be transmitted each time, and it takes at least one minute to read 50,000 pieces of temperature data. By contrast, in a data collection mode of the present disclosure, compressed data can be rapidly collected through a temperature collection request, continuing with the same example, it may only take about 10 seconds to read compressed data corresponding to the same 50,000 pieces of temperature data, thereby effectively improving the data collection speed and efficiency.

In one example, before the application sends the temperature collection request to the temperature recorder, its validity is verified, in one example, using a blockchain server. One example validity verification process may include the following steps:

1) Uplink information of the application to the blockchain server a name, a version number, and an identification number of the application are acquired;

a hash calculation is performed according to the name, the version number, and the identification number of the application to obtain a first hash value;

the first hash value is transmitted to the blockchain server;

2) Bind the temperature recorder and the application based on the blockchain server first identification data of the temperature recorder and second identification data of the application are acquired;

hash calculation is performed on the first identification data, the second identification data, and a salt value to obtain a public key;

the public key is transmitted to the blockchain server, and a hash calculation is performed at the blockchain server according to the public key and the salt value to obtain a private key;

wherein both the public key and the private key are stored in the temperature recorder.

3) Verify the validity of information of the application by the blockchain server a first name, a first version number, and a first identification number of the application are acquired;

hash calculation is performed according to the first name, the first version number, and the first identification number of the application to obtain a second hash value;

it is determined whether the second hash value and the first hash value are the same, and if they are the same, the application is valid, otherwise, it is determined that the application is invalid In some examples, Step S2102 may further include:

sending, by the temperature recorder, a target signature value to the application according to the temperature collection request.

After step S2103, the method may further include the following steps.

S2104: The application sends the target signature value and the actual temperature data to the blockchain server.

S2105: The blockchain server performs hash calculation according to the private key and the actual temperature data to obtain a second signature value.

Specifically, when the first storage space of the temperature recorder is full and the corresponding number of pieces of temperature data is a first set quantity, the step that the blockchain server performs hash calculation according to the private key and the actual temperature data to obtain a second signature value includes:

when the number of pieces of temperature data corresponding to the temperature recording time period is less than or equal to the first set quantity, performing hash calculation according to the private key and the actual temperature data to obtain the second signature value;

when the number of pieces of temperature data corresponding to the temperature recording time period is greater than the first set quantity, performing hash calculation on the private key and a first group of the first set quantity of actual temperature data in a chronological order to obtain a fourth signature value;

continuing to perform hash calculation on the private key, a Mth group of the first set quantity of actual temperature data, and the fourth signature value corresponding to the previous group to obtain a fifth signature value, where M≥2 and M is an integer;

when the number of remaining pieces of temperature data in the temperature recording time period is less than or equal to the first set quantity, performing hash calculation according to the private key, the remaining actual temperature data, and the fifth signature value corresponding to the previous group to obtain the second signature value;

That is, the above process of calculating the second signature value corresponds to the process of calculating the target signature value in the temperature recorder.

If the storage configuration of the temperature recorder is relatively high, the signature value may be directly obtained through direct hash calculation according to the private key and the temperature data, without multiple iterative calculations.

S2106: It is determined whether the second signature value and the target signature value are consistent, and if they are consistent, it is determined that the actual temperature data is not tampered with.

In addition, before step S2104, the method may further include:

sending, by the temperature recorder, the total number of pieces of first temperature data stored in the temperature recorder to the application according to the temperature collection request;

calculating, by the application, the total number of pieces of second temperature data corresponding to the actual temperature data; and determining whether the total number of pieces of first temperature data and the total number of pieces of second temperature data are consistent, and if they are consistent, determining to perform step S2104.

That is, the number of pieces of actually stored temperature data is compared with the number of collected temperature data to further assist in the validity verification process of the temperature data to improve the accuracy of a temperature data verification result.

Any of a variety of hash algorithms known in the art may be user. By way of non-limiting example, a SHA256 algorithm (a hash value calculation algorithm) is used for one or more hash calculations.

In one example, for an entire cold chain transportation process, starting time data and temperature data corresponding to each time stamp in the transportation process are acquired, and the temperature data is compressed. Therefore, a plurality of pieces of temperature data may correspond to one piece of compressed data, so that each piece of temperature data only occupies a very small storage space, and the starting time data and the plurality of pieces of compressed data are stored into a temperature recorder together, thereby effectively improving the storage performance of the temperature recorder. Meanwhile, when an application collects temperature data from the temperature recorder, through directly collecting the compressed data, hundreds of thousands of temperature data are rapidly collected, thereby achieving the effect of rapidly collecting temperature data. In addition, the blockchain technology-based verification on the collected temperature data ensures the security and authenticity of temperature data collection and prevents data from being tampered with.

FOURTH EXAMPLE IMPLEMENTATION

Figure 3:
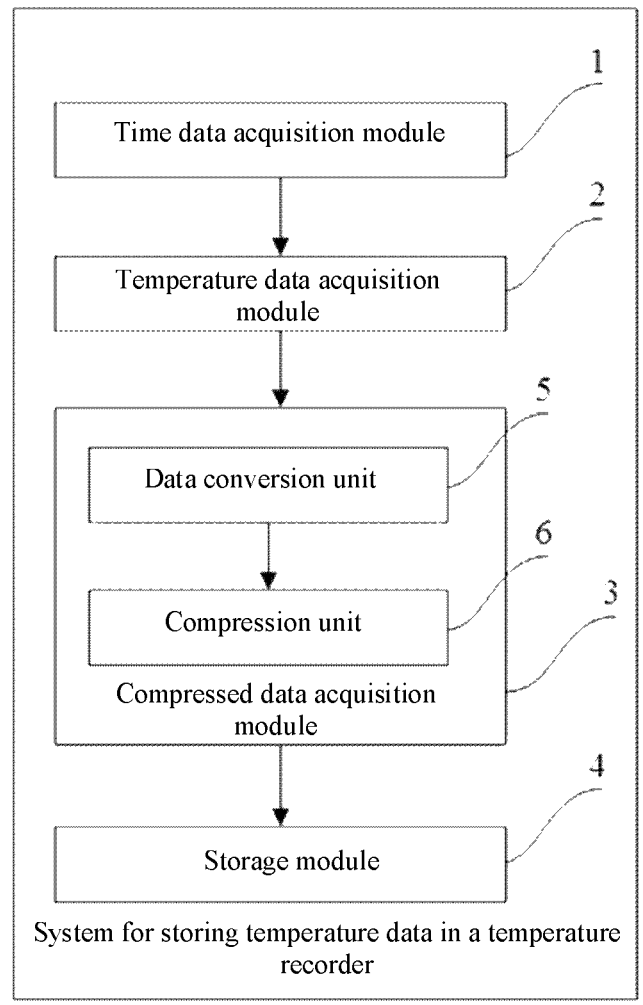
FIG. 3 is a functional block diagram of an example system for storing temperature data.

FIG. 3 is a functional block diagram of one example of a system for storing temperature data in a temperature recorder made in accordance with the present disclosure. In the illustrated example, the system includes a time data acquisition module 1, temperature data acquisition module 2, compressed data acquisition module 3, and storage module 4, wherein time data acquisition module 1 is configured to acquire starting time data corresponding to a temperature recording time period;

temperature data acquisition module 2 is configured to acquire actual temperature data corresponding to each time stamp in the temperature recording time period of the temperature recorder;

compressed data acquisition module 3 is configured to obtain at least one piece of target compressed data corresponding to the temperature recording time period by compressing the actual temperature data;

wherein each piece of the target compressed data corresponds to a plurality of pieces of actual temperature data;

specifically, compressed data acquisition module 3 includes data conversion unit 5 and compression unit 6;

data conversion unit 6 is configured to convert the actual temperature data into intermediate temperature data;

wherein the intermediate temperature data is data in a binary format; and compression unit 6 is configured to compress the intermediate temperature data to obtain at least one piece of the target compressed data;

wherein each piece of the target compressed data corresponds to a set quantity of bits or bytes.

The value of the set quantity may be determined and adjusted according to an actual situation, as long as it can realize effective compression of temperature data.

In some examples, each piece of target compressed data corresponds to one bit.

In addition, the number of pieces of the actual temperature data corresponding to each piece of target compressed data is positively correlated with a temperature change range corresponding to the temperature recording time period. For details, see the following table:

| Bits occupied for storage | number of pieces of temperature data | Storage accuracy | Absolute value of temperature change range |
|---|---|---|---|
| 5 | 32 | 0.1 | 0-3.2 |
| 6 | 64 | 0.1 | 0-6.4 |
| 7 | 128 | 0.1 | 0-12.8 |
| 8 | 256 | 0.1 | 0-25.6 |
| 9 | 512 | 0.1 | 0-51.2 |
| 10 | 1024 | 0.1 | 0-102.4 |
| 11 | 2048 | 0.1 | 0-204.8 |

That is, under the condition of certain storage accuracy, the BIT occupied by each piece of temperature data is automatically switched according to a temperature change range configured by a user.

Storage module 4 is configured to store the starting time data and the target compressed data corresponding to the temperature recording time period into a storage space of the temperature recorder.

In the present embodiment, only starting time data in the temperature storage process is stored, and then each piece of temperature data is compressed and stored together with the starting time data according to bits.

A data storage situation during cold chain transportation is illustrated through the following specific examples.

Taking a refrigerated transportation temperature change range of 0° C.-7° C. as an example, it is assumed that 128 pieces of temperature data corresponding to 128 time stamps are collected. In an existing prior art storage mode of time stamp+temperature data, 4 bytes+2 bytes (6 bytes in total) are required for storing one piece of temperature data, that is, 128 pieces of temperature data need to occupy a storage space of 768 bytes.

In the data storage mode of starting time data+a plurality of pieces of target compressed data in the present embodiment, a storage space of only 7 bits is occupied, and 7 bits correspond to 128 pieces of temperature data, which achieves that each piece of temperature data only occupies less than one byte, thereby greatly reducing the storage space corresponding to temperature data.

In the present embodiment, for the entire cold chain transportation process, starting time data and temperature data corresponding to each time stamp in the transportation process are acquired, and the temperature data is compressed. Therefore, a plurality of pieces of temperature data may correspond to one piece of compressed data, so that each piece of temperature data only occupies a very small storage space, and the starting time data and the plurality of pieces of compressed data are stored into a temperature recorder together, thereby effectively improving the storage performance of the temperature recorder.

FIFTH EXAMPLE IMPLEMENTATION

In one example, a system for storing temperature data in a temperature recorder may have one or more of the following characteristics:

the storage space includes a first storage space, a second storage space, and a third storage space.

In the data storage process, storage module 4 is configured to determine whether the first storage space is full, if the first storage space is not full, pre-compress the actual temperature data to obtain first temperature data, and store the first temperature data into the first storage space;

if the first storage space is full, determine whether the second storage space is full, if the second storage space is not full, compress all the first temperature data in the first storage space, acquire the plurality of pieces of target compressed data corresponding to the temperature recording time period, and sequentially store the target compressed data into the second storage space in a chronological order while deleting all the data in the first storage space; and if the second storage space is full, generate a reminder message reminding that storage cannot be continued.

Storage module 4 is further configured to store, when the temperature recorder is bound to an application in a data collection device, a public key and a private key generated in the binding process into the third storage space, wherein the temperature recorder and the application in the data collection device transmit data through NFC;

when a situation where the first storage space is full and the second storage space is not full appears in the temperature recorder for the first time, decompress all the pre-compressed first temperature data in the first storage space to acquire the corresponding actual temperature data;

perform hash calculation on the actual temperature data and the private key to obtain a first signature value;

when the situation where the first storage space is full and the second storage space is not full appears for the Nth time, perform hash calculation on the actual temperature data, the private key, and the previously corresponding first signature value, and when the temperature recorder finishes recording temperature data, acquire a corresponding target signature value to obtain a new first signature value, where N≥2 and N is an integer;

when the temperature recorder finishes recording temperature data, if there is no data in the first storage space, use the first signature value as a target signature value;

when the temperature recorder finishes recording temperature data, if the first storage space is not full and the second storage space is not full, perform hash calculation on the actual temperature data, the private key, and the previously corresponding first signature value to obtain a target signature value; and store the target signature value into the third storage space.

That is, when the temperature recorder collects temperature data, the temperature data is first stored into the first storage space, when the first storage space is full, all data in the first storage space is compressed according to the above compression mode and stored into the second storage space, and the data in the first storage space is cleared. Meanwhile, storing newly collected temperature data into the first storage space is continued, and the above storage process is repeated until both the first storage space and the second storage space are full, then it is reminded that storage cannot be continued.

In addition, a signature value is obtained through calculation according to the private key obtained when the temperature recorder is bound to the application in the data collection device and the temperature data in the first storage space, and the previous signature value is added to the private key and the temperature data in the first storage space for hash calculation to obtain a new signature value. When the temperature data storage is ended, hash calculation is performed to obtain a final target signature value which may be used to verify whether the temperature data is tampered with to ensure the validity of the temperature data. The third storage space belongs to a non-erasable area in the temperature recorder.

In the present example, for the entire cold chain transportation process, starting time data and temperature data corresponding to each time stamp in the transportation process are acquired, and the temperature data is compressed. Therefore, a plurality of pieces of temperature data may correspond to one piece of compressed data, so that each piece of temperature data only occupies a very small storage space, and the starting time data and the plurality of pieces of compressed data are stored into a temperature recorder together, thereby effectively improving the storage performance of the temperature recorder.

SIXTH EXAMPLE IMPLEMENTATION

Figure 4:
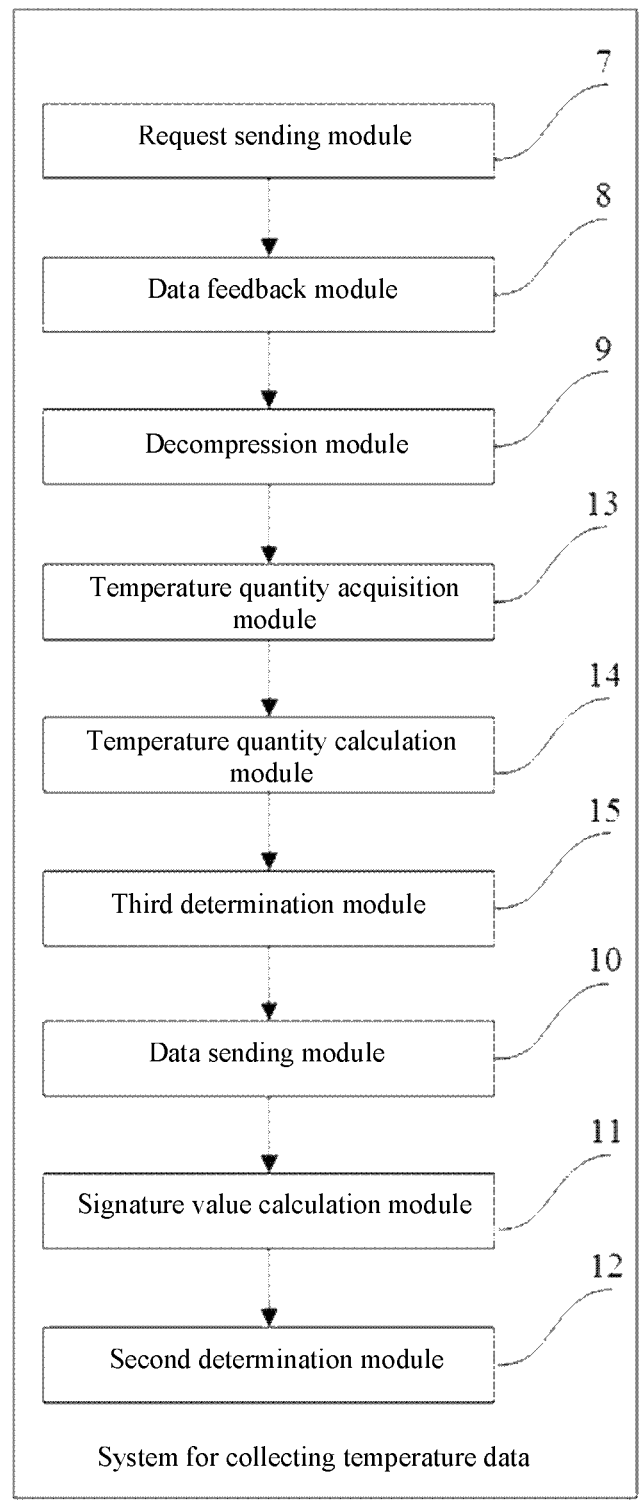
FIG. 4 is a functional block diagram of an example system for collecting temperature data.

FIG. 4 is a functional block diagram of one example of a system for collecting temperature data.

The illustrated collection system includes request sending module 7, data feedback module 8, and decompression module 9, wherein an application sends a temperature collection request to the temperature recorder according to request sending module 7;

the temperature recorder uses data feedback module 8 to send the plurality of pieces of target compressed data corresponding to the temperature recording time period to the application according to the temperature collection request;

the application decompresses the target compressed data according to decompression module 9 to acquire the actual temperature data corresponding to each time stamp in the temperature recording time period.

Specifically, based on an existing temperature collection mode, when the application collects temperature data, due to the limitation of NFC, only about 250 pieces of temperature data can be transmitted each time, and it takes at least one minute to read 50,000 pieces of temperature data. In the data collection mode of the present embodiment, corresponding compressed data is rapidly collected through the temperature collection request, so that it only takes about 10 seconds to read 50,000 pieces of temperature data, thereby effectively improving the data collection speed and efficiency.

In one example, before the application sends the temperature collection request to the temperature recorder, a validity process using a blockchain server is performed. In one example, the validity process is as follows.

The collection system further includes a program data acquisition module, a first hash value acquisition module, an uplinking module, a first determination module, an identification data acquisition module, a second hash calculation module, and a private key calculation module.

1) Transmit Information of the Application to the Blockchain Server the program data acquisition module is configured to acquire a name, a version number, and an identification number of the application;

the first hash calculation module is configured to perform hash calculation according to the name, the version number, and the identification number of the application to obtain a first hash value;

the uplinking module is configured to transmit the first hash value to a blockchain server;

2) Bind the Temperature Recorder and the Application Based On the Blockchain Server the identification data acquisition module is configured to acquire first identification data of the temperature recorder and second identification data of the application;

the second hash calculation module is configured to perform hash calculation on the first identification data and the second identification data to obtain a public key;

the private key calculation module is configured to uplink the public key to the blockchain server, and perform hash calculation in the blockchain server according to the public key to obtain a private key;

wherein both the public key and the private key are stored in the temperature recorder;

3) Verify the Validity of Information of the Application By the Blockchain Server the program data acquisition module is configured to acquire a first name, a first version number, and a first identification number of the application;

the first hash calculation module is configured to perform hash calculation according to the first name, the first version number, and the first identification number of the application to obtain a second hash value;

the first determination module is configured to determine whether the second hash value and the first hash value are consistent, and if they are consistent, determine that the application is valid, otherwise, determine that the application is invalid.

The temperature recorder uses the data feedback module to send a target signature value corresponding to the target compressed data to the application according to the temperature collection request.

The collection system further includes data sending module 10, signature value calculation module 11, and second determination module 12, wherein the application uses data sending module 10 to send the target signature value and the actual temperature data to the blockchain server;

the blockchain server uses signature value calculation module 11 to perform hash calculation according to the private key and the actual temperature data to obtain a second signature value;

second determination module 12 is configured to determine whether the second signature value and the target signature value are consistent, and if they are consistent, determine that the actual temperature data is not tampered with.

Specifically, when the first storage space of the temperature recorder is full and the corresponding number of pieces of temperature data is a first set quantity, the signature value calculation module is configured to perform, when the number of pieces of temperature data corresponding to the temperature recording time period is less than or equal to the first set quantity, hash calculation according to the private key and the actual temperature data to obtain the second signature value;

perform, when the number of pieces of temperature data corresponding to the temperature recording time period is greater than the first set quantity, hash calculation on the private key and a first group of the first set quantity of actual temperature data in a chronological order to obtain a fourth signature value;

continue to perform hash calculation on the private key, a Mth group of the first set quantity of actual temperature data, and the fourth signature value corresponding to the previous group to obtain a fifth signature value, where M≥2 and M is an integer;

perform, when the number of remaining pieces of temperature data in the temperature recording time period is less than or equal to the first set quantity, hash calculation according to the private key, the remaining actual temperature data, and the fifth signature value corresponding to the previous group to obtain the second signature value;

that is, the above process of calculating the second signature value corresponds to the process of calculating the target signature value in the temperature recorder.

If the storage configuration of the temperature recorder is relatively high, the signature value may be directly obtained through direct hash calculation according to the private key and the temperature data, without multiple iterative calculations.

The collection system further includes temperature quantity acquisition module 13, temperature quantity calculation module 14, and third determination module 15, wherein the temperature recorder uses temperature quantity acquisition module 13 to send the total number of pieces of first temperature data stored in the temperature recorder to the application according to the temperature collection request;

the application uses temperature quantity calculation module 14 to calculate the total number of pieces of second temperature data corresponding to the actual temperature data;

third determination module 15 is configured to determine whether the total number of pieces of first temperature data and the total number of pieces of second temperature data are consistent, and if they are consistent, call the data sending module.

That is, the number of pieces of actually stored temperature data is compared with the number of collected temperature data to further assist in the validity verification process of the temperature data to improve the accuracy of a temperature data verification result.

A SHA256 algorithm may be used for hash calculation.

In the present embodiment, for the entire cold chain transportation process, starting time data and temperature data corresponding to each time stamp in the transportation process are acquired, and the temperature data is compressed. Therefore, a plurality of pieces of temperature data may correspond to one piece of compressed data, so that each piece of temperature data only occupies a very small storage space, and the starting time data and the plurality of pieces of compressed data are stored into a temperature recorder together, thereby effectively improving the storage performance of the temperature recorder. Meanwhile, when an application collects temperature data from the temperature recorder, through directly collecting the compressed data, hundreds of thousands of temperature data are rapidly collected, thereby achieving the effect of rapidly collecting temperature data. In addition, the blockchain technology-based verification on the collected temperature data ensures the security and authenticity of temperature data collection and prevents data from being tampered with.

SEVENTH EXAMPLE IMPLEMENTATION

Figure 5:
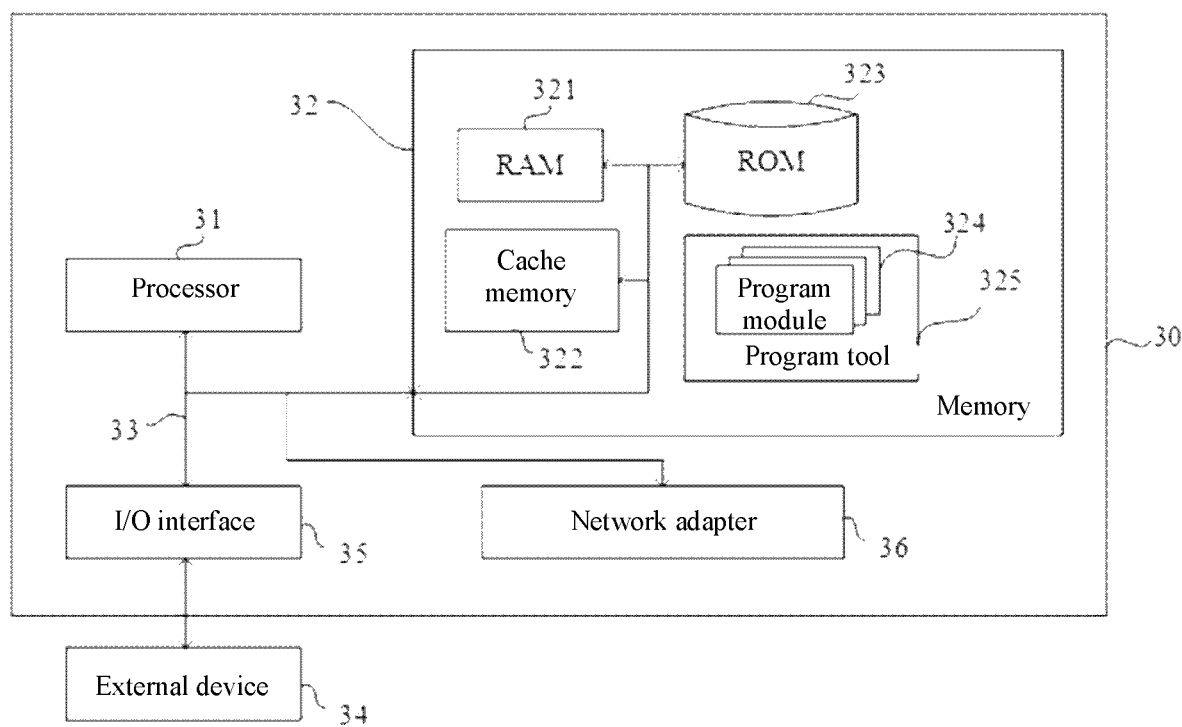
FIG. 5 is a functional block diagram of an example electronic device for storing temperature data.

FIG. 5 is a functional block diagram of an example electronic device made in accordance with the present disclosure. The electronic device includes a memory, a processor, and a computer program stored on the memory and runnable on the processor. The processor implements, when executing the program, a method for storing temperature data in a temperature recorder as described herein. Electronic device 30 shown in FIG. 5 is only an example, and should not bring any limitation to the function and application scope of the embodiments of the present disclosure.

As shown in FIG. 5, electronic device 30 may be in the form of a general computing device. For example, it may be a server device. Components of electronic device 30 may include, but are not limited to, the aforementioned at least one processor 31, the aforementioned at least one memory 32, and bus 33 connecting different system components (including memory 32 and processor 31).

Bus 33 includes a data bus, an address bus, and a control bus.

Memory 32 may include a volatile memory, such as random access memory (RAM) 321 and/or cache memory 322, and may further include read only memory (ROM) 323.

Memory 32 may further include program/utility tool 325 having a group of (at least one) program modules 324. Such program module 324 includes, but is not limited to, an operating system, one or more applications, other program modules, and program data. Each or some combination of the examples may include an implementation of a network environment.

Processor 31 executes various functional applications and data processing by running a computer program stored in memory 32, for example, the method for storing temperature data in a temperature recorder in any one of Embodiment 1 or 2 of the present disclosure.

Electronic device 30 may also communicate with one or more external devices 34 (such as keyboards and pointing devices). This communication may be performed through input/output (I/O) interface 35. In addition, device 30 generated by a model may also communicate with one or more networks (for example, a local area network (LAN), a wide area network (WAN), and/or a public network, such as the Internet) through network adapter 36. As shown in FIG. 5, network adapter 36 communicates with other modules of device 30 generated by a model through bus 33. It should be understood that although not shown in the figure, other hardware and/or software modules may be used in conjunction with device 30 generated by a model, including but not limited to, microcode, device drivers, redundant processors, external disk drive arrays, redundant array of independent disks (RAID) systems, tape drives, and data backup storage systems, etc.

It should be noted that although several units/modules or sub-units/modules of the electronic device are mentioned in the above detailed description, this division is only an example and not mandatory. In fact, according to the implementations of the present disclosure, the features and functions of two or more units/modules described above may be embodied in one unit/module. Conversely, the features and functions of one unit/module described above may be further divided into multiple units/modules to be embodied.

EIGHTH EXAMPLE IMPLEMENTATION

In another example an electronic device may include a memory, a processor, and a computer program stored in the memory and runnable on the processor. The processor implements, when executing the program, a method for collecting temperature data as described herein, for example, as described in the third example implementation. For the specific structure of the electronic device, reference may be made to the electronic device of FIG. 5.

NINTH EXAMPLE IMPLEMENTATION

In one example a computer-readable storage medium is provided having a computer program stored thereon. When the program is executed by a processor, steps of a method for storing temperature data in a temperature recorder as described herein is implemented.

The readable storage medium may more specifically include, but is not limited to: a portable disk, a hard disk, a random access memory, a read-only memory, an erasable programmable read-only memory, an optical storage device, a magnetic storage device or any suitable combination of the above.

In a possible implementation, the present disclosure may also be implemented in the form of a program product, which includes program code. When the program product runs on a terminal device, the program code is used to cause the terminal device to perform the steps in the method for storing temperature data in a temperature recorder according to any of the methods described herein.

Program code for executing methods of the present disclosure may be written in any combination of one or more programming languages. The program code may be entirely executed on user equipment, partly executed on user equipment, executed as an independent software package, partly executed on user equipment and partly executed on a remote device, or entirely executed on a remote device.

TENTH EXAMPLE IMPLEMENTATION

In one example a computer-readable storage medium is provided having a computer program stored thereon. When the program is executed by a processor, steps of a method for collecting temperature data as described herein is implemented, for example, as described in the third example implementation.

The readable storage medium may more specifically include, but is not limited to: a portable disk, a hard disk, a random access memory, a read-only memory, an erasable programmable read-only memory, an optical storage device, a magnetic storage device or any suitable combination of the above.

In a possible implementation, the present disclosure may also be implemented in the form of a program product, which includes program code. When the program product runs on a terminal device, the program code is used to cause the terminal device to perform the steps in a method for collecting temperature data as described herein.

The program code for executing the present disclosure may be written in any combination of one or more programming languages. The program code may be entirely executed on user equipment, partly executed on user equipment, executed as an independent software package, partly executed on user equipment and partly executed on a remote device, or entirely executed on a remote device.

Although specific implementations of the present disclosure have been described above, those skilled in the art should understand that this is only an example, and the protection scope of the present disclosure is defined by the appended claims. Those skilled in the art can make various changes or modifications to these implementations without departing from the principle and essence of the present disclosure, but these changes and modifications all fall within the protection scope of the present disclosure.

The invention claimed is:

1. A method for storing temperature data in a temperature recorder, comprising:
   S11: acquiring starting time data corresponding to a temperature recording time period, and acquiring actual temperature data corresponding to each time stamp in the temperature recording time period of the temperature recorder;
   S12: obtaining at least one piece of target compressed data corresponding to the temperature recording time period by compressing the actual temperature data,
   wherein each piece of the target compressed data corresponds to a plurality of pieces of the actual temperature data,
   converting the actual temperature data into intermediate temperature data,
   wherein the intermediate temperature data is data in a binary format; and
   compressing the intermediate temperature data to obtain at least one piece of the target compressed data,
   wherein each piece of the target compressed data corresponds to a set quantity of bits or bytes; and
   S13: storing the starting time data and the target compressed data corresponding to the temperature recording time period in a storage space of the temperature recorder,
   wherein each piece of the target compressed data corresponds to one bit; and/or
   a number of pieces of the actual temperature data corresponding to each piece of the target compressed data is positively correlated with a temperature change range corresponding to the temperature recording time period.

2. An electronic device, comprising a memory, a processor, and a computer program stored on the memory and runnable on the processor, wherein when executing the computer program, the processor implements the method for storing temperature data in a temperature recorder according to claim 1.

3. A non-transitory computer-readable storage medium having a computer program stored thereon, wherein the computer program, when executed by a processor, implements steps of the method for storing temperature data in a temperature recorder according to claim 1.

4. A method for storing temperature data in a temperature recorder, comprising:
   S11: acquiring starting time data corresponding to a temperature recording time period, and acquiring actual temperature data corresponding to each time stamp in the temperature recording time period of the temperature recorder;
   S12: obtaining at least one piece of target compressed data corresponding to the temperature recording time period by compressing the actual temperature data,
   wherein each piece of the target compressed data corresponds to a plurality of pieces of the actual temperature data; and
   S13: storing the starting time data and the target compressed data corresponding to the temperature recording time period in a storage space of the temperature recorder, wherein the storage space comprises a first storage space and a second storage space;
   determining whether the first storage space is full, if the first storage space is not full, pre-compressing the actual temperature data to obtain first temperature data, and storing the first temperature data into the first storage space;
   if the first storage space is full, determining whether the second storage space is full, if the second storage space is not full, compressing all the first temperature data in the first storage space, acquiring the plurality of pieces of target compressed data corresponding to the temperature recording time period, and sequentially storing the target compressed data into the second storage space in a chronological order while deleting all the data in the first storage space; and
   if the second storage space is full, generating a message that storage cannot be continued.

5. The method for storing temperature data in a temperature recorder according to claim 4, wherein the storage space further comprises a third storage space;
   and the method further comprises:
   when the temperature recorder is bound during a binding process to an application in a data collection device, storing a public key and a private key generated in the binding process into the third storage space;
   when an occurrence of the first storage space being full and the second storage space not being full occurs for a first time, decompressing all the pre-compressed first temperature data in the first storage space to acquire the corresponding actual temperature data; and
   performing a hash calculation on the actual temperature data and the private key to obtain a first signature value;
   when the occurrence of the first storage space being full and the second storage space being not full occurs for an Nth time, performing a hash calculation on the actual temperature data, the private key, and the first signature value to obtain a new first signature value, where $N \geq 2$ and N is an integer; and
   when the temperature recorder finishes recording temperature data, if there is no data in the first storage space, using the first signature value as a target signature value; and/or
   when the temperature recorder finishes recording temperature data, if the first storage space is not full and the second storage space is not full, performing a hash calculation on the actual temperature data, the private key, and the previously corresponding first signature value to obtain a target signature value; and
   storing the target signature value into the third storage space.

6. A method for storing temperature data in a temperature recorder, comprising:
   S11: acquiring starting time data corresponding to a temperature recording time period, and acquiring actual temperature data corresponding to each time stamp in the temperature recording time period of the temperature recorder;
   S12: obtaining at least one piece of target compressed data corresponding to the temperature recording time period by compressing the actual temperature data, wherein each piece of the target compressed data corresponds to a plurality of pieces of the actual temperature data;

S13: storing the starting time data and the target compressed data corresponding to the temperature recording time period in a storage space of the temperature recorder;

S21: sending, by an application in a data collection device, a temperature collection request to the temperature recorder;

S22: sending, by the temperature recorder, the plurality of pieces of target compressed data corresponding to the temperature recording time period to the application according to the temperature collection request; and S23: decompressing, by the application, the target compressed data to acquire the actual temperature data corresponding to each time stamp in the temperature recording time period, wherein before step S21, the method further comprises:

acquiring a name, a version number, and an identification number of the application;

performing a hash calculation according to the name, the version number, and the identification number of the application to obtain a first hash value;

uplinking the first hash value to a blockchain server;

acquiring first identification data of the temperature recorder and second identification data of the application;

performing a hash calculation on the first identification data and the second identification data to obtain a public key; and uplinking the public key to the blockchain server, and performing a hash calculation in the blockchain server according to the public key to obtain a private key, wherein both the public key and the private key are stored in the temperature recorder;

and before step S21, the method further comprises:

acquiring a first name, a first version number, and a first identification number of the application;

performing a hash calculation according to the first name, the first version number, and the first identification number of the application to obtain a second hash value; and determining whether the second hash value and the first hash value are consistent, and if they are consistent, determining that the application is valid, otherwise, determining that the application is invalid.

7. The method for collecting temperature data according to claim 6, wherein step S22 further comprises:

sending, by the temperature recorder, a target signature value to the application according to the temperature collection request;

and after step S23, the method further comprises:

S24: sending, by the application, the target signature value and the actual temperature data to the blockchain server;

S25: performing, by the blockchain server, a hash calculation according to the private key and the actual temperature data to obtain a second signature value; and S26: determining whether the second signature value and the target signature value are consistent, and if they are consistent, determining that the actual temperature data is not tampered with.

8. The method for collecting temperature data according to claim 7, wherein the storage space comprises at least a first storage space, wherein when the first storage space of the temperature recorder is full and a corresponding number of pieces of temperature data is a first set quantity, the step of performing, by the blockchain server, a hash calculation according to the private key and the actual temperature data to obtain a second signature value comprises:

when a number of pieces of temperature data corresponding to the temperature recording time period is less than or equal to the first set quantity, performing a hash calculation according to the private key and the actual temperature data to obtain the second signature value; and when the number of pieces of temperature data corresponding to the temperature recording time period is greater than the first set quantity, performing a hash calculation on the private key and a first group of the first set quantity of actual temperature data in a chronological order to obtain a fourth signature value;

continuing to perform a hash calculation on the private key, an Mth group of the first set quantity of actual temperature data, and the fourth signature value corresponding to a previous group to obtain a fifth signature value, where M≥2 and M is an integer;

when a number of remaining pieces of temperature data in the temperature recording time period is less than or equal to the first set quantity, performing hash calculation according to the private key, the remaining actual temperature data, and the fifth signature value corresponding to the previous group to obtain the second signature value; and/or before step S24, the method further comprises:

sending, by the temperature recorder, a total number of pieces of first temperature data stored in the temperature recorder to the application according to the temperature collection request;

calculating, by the application, a total number of pieces of second temperature data corresponding to the actual temperature data; and determining whether the total number of pieces of first temperature data and the total number of pieces of second temperature data are consistent, and if they are consistent, determining to perform step S24.

9. A system for storing temperature data in a temperature recorder, comprising a hardware processor including a time data acquisition module, a temperature data acquisition module, a compressed data acquisition module, and a storage module, wherein the time data acquisition module is configured to acquire starting time data corresponding to a temperature recording time period;

the temperature data acquisition module is configured to acquire actual temperature data corresponding to each time stamp in the temperature recording time period of the temperature recorder;

the compressed data acquisition module is configured to obtain at least one piece of target compressed data corresponding to the temperature recording time period by compressing the actual temperature data, wherein each piece of the target compressed data corresponds to a plurality of pieces of the actual temperature data; and the storage module is configured to store the starting time data and the target compressed data corresponding to the temperature recording time period into a storage space of the temperature recorder, wherein the storage space comprises a first storage space and a second storage space;

the storage module is configured to determine whether the first storage space is full, if the first storage space is not full, pre-compress the actual temperature data to obtain first temperature data, and store the first temperature data into the first storage space;

if the first storage space is full, determine whether the second storage space is full, if the second storage space is not full, compress all the first temperature data in the first storage space, acquire the plurality of pieces of target compressed data corresponding to the temperature recording time period, and sequentially store the target compressed data into the second storage space in a chronological order while deleting all the data in the first storage space; and if the second storage space is full, generate a message that storage cannot be continued.

10. The system for storing temperature data in a temperature recorder according to claim 9, wherein the storage space further comprises a third storage space;

and the storage module is further configured to: store, when the temperature recorder is bound to an application in a data collection device during a binding process, a public key and a private key generated in the binding process into the third storage space;

when an occurrence of the first storage space being full and the second storage space being not full appears in the temperature recorder for a first time, decompress all the pre-compressed first temperature data in the first storage space to acquire the corresponding actual temperature data; and perform a hash calculation on the actual temperature data and the private key to obtain a first signature value;

when an occurrence of the first storage space being full and the second storage space being not full appears for an Nth time, perform a hash calculation on the actual temperature data, the private key, and the first signature value, and when the temperature recorder finishes recording temperature data, acquire a corresponding target signature value to obtain a new first signature value, where N≥2 and N is an integer; and when the temperature recorder finishes recording temperature data, if there is no data in the first storage space, use the first signature value as a target signature value; and/or when the temperature recorder finishes recording temperature data, if the first storage space is not full and the second storage space is not full, perform a hash calculation on the actual temperature data, the private key, and the previously corresponding first signature value to obtain a target signature value; and store the target signature value into the third storage space.

11. A system for storing temperature data in a temperature recorder, comprising a hardware processor including a time data acquisition module, a temperature data acquisition module, a compressed data acquisition module, and a storage module, wherein the time data acquisition module is configured to acquire starting time data corresponding to a temperature recording time period;

the temperature data acquisition module is configured to acquire actual temperature data corresponding to each time stamp in the temperature recording time period of the temperature recorder;

the compressed data acquisition module is configured to obtain at least one piece of target compressed data corresponding to the temperature recording time period by compressing the actual temperature data, wherein each piece of the target compressed data corresponds to a plurality of pieces of the actual temperature data; and the storage module is configured to store the starting time data and the target compressed data corresponding to the temperature recording time period into a storage space of the temperature recorder, wherein the compressed data acquisition module comprises a data conversion unit and a compression unit;

the data conversion unit is configured to convert the actual temperature data into intermediate temperature data, wherein the intermediate temperature data is data in a binary format; and the compression unit is configured to compress the intermediate temperature data to obtain at least piece one of the target compressed data, wherein each piece of the target compressed data corresponds to a set quantity of bits or bytes, wherein each piece of the target compressed data corresponds to one bit; and/or a number of pieces of the actual temperature data corresponding to each piece of the target compressed data is positively correlated with a temperature change range corresponding to the temperature recording time period.

12. A system for storing temperature data in a temperature recorder, comprising a hardware processor including a time data acquisition module, a temperature data acquisition module, a compressed data acquisition module, and a storage module, wherein the time data acquisition module is configured to acquire starting time data corresponding to a temperature recording time period;

the temperature data acquisition module is configured to acquire actual temperature data corresponding to each time stamp in the temperature recording time period of the temperature recorder;

the compressed data acquisition module is configured to obtain at least one piece of target compressed data corresponding to the temperature recording time period by compressing the actual temperature data, wherein each piece of the target compressed data corresponds to a plurality of pieces of the actual temperature data; and the storage module is configured to store the starting time data and the target compressed data corresponding to the temperature recording time period into a storage space of the temperature recorder;

a request sending module, a data feedback module, and a decompression module, wherein an application sends a temperature collection request to the temperature recorder according to the request sending module;

the temperature recorder uses the data feedback module to send the plurality of pieces of target compressed data corresponding to the temperature recording time period to the application according to the temperature collection request; and the application decompresses the target compressed data according to the decompression module to acquire the actual temperature data corresponding to each time stamp in the temperature recording time period;

a program data acquisition module, a first hash calculation module, an uplinking module, a first determination module, an identification data acquisition module, a second hash calculation module, and a private key calculation module, wherein
  the program data acquisition module is configured to acquire a name, a version number, and an identification number of the application;
  the first hash calculation module is configured to perform hash calculation according to the name, the version number, and the identification number of the application to obtain a first hash value;
  the uplinking module is configured to uplink the first hash value to a blockchain server;
  the identification data acquisition module is configured to acquire first identification data of the temperature recorder and second identification data of the application;
  the second hash calculation module is configured to perform hash calculation on the first identification data and the second identification data to obtain a public key;
  the private key calculation module is configured to uplink the public key to the blockchain server, and perform hash calculation in the blockchain server according to the public key to obtain a private key,
  wherein both the public key and the private key are stored in the temperature recorder;
  the program data acquisition module is configured to acquire a first name, a first version number, and a first identification number of the application;
  the first hash calculation module is configured to perform hash calculation according to the first name, the first version number, and the first identification number of the application to obtain a second hash value; and
  the first determination module is configured to determine whether the second hash value and the first hash value are consistent, and if they are consistent, determine that the application is valid, otherwise, determine that the application is invalid.

13. The system for collecting temperature data according to claim 12, wherein the temperature recorder uses the data feedback module to send a target signature value corresponding to the target compressed data to the application according to the temperature collection request;
  the collection system further comprises a data sending module, a signature value calculation module, and a second determination module;
  the application uses the data sending module to send the target signature value and the actual temperature data to the blockchain server;
  the blockchain server uses the signature value calculation module to perform hash calculation according to the private key and the actual temperature data to obtain a second signature value; and
  the second determination module is configured to determine whether the second signature value and the target signature value are consistent, and if they are consistent, determine that the actual temperature data is not tampered with.

14. The system for collecting temperature data according to claim 13, wherein the storage space comprises at least a first storage space, wherein when the first storage space of the temperature recorder is full and a corresponding number of pieces of temperature data is a first set quantity, the signature value calculation module is configured to: perform, when a number of pieces of temperature data corresponding to the temperature recording time period is less than or equal to the first set quantity, hash calculation according to the private key and the actual temperature data to obtain the second signature value;
  perform, when the number of pieces of temperature data corresponding to the temperature recording time period is greater than the first set quantity, hash calculation on the private key and a first group of a first set quantity of actual temperature data in a chronological order to obtain a fourth signature value;
  continue to perform hash calculation on the private key, a Mth group of the first set quantity of actual temperature data, and the fourth signature value corresponding to a previous group to obtain a fifth signature value, where $M \geq 2$ and M is an integer;
  perform, when a number of remaining pieces of temperature data in the temperature recording time period is less than or equal to the first set quantity, hash calculation according to the private key, the remaining actual temperature data, and the fifth signature value corresponding to the previous group to obtain the second signature value; and/or
  the collection system further comprises a temperature quantity acquisition module, a temperature quantity calculation module, and a third determination module;
  the temperature recorder uses the temperature quantity acquisition module to send a total number of pieces of first temperature data stored in the temperature recorder to the application according to the temperature collection request;
  the application uses the temperature quantity calculation module to calculate a total number of pieces of second temperature data corresponding to the actual temperature data; and
  the third determination module is configured to determine whether the total number of pieces of first temperature data and the total number of pieces of second temperature data are consistent, and if they are consistent, call the data sending module.

* * * * *